United States Patent
Guven et al.

(10) Patent No.: US 7,319,701 B2
(45) Date of Patent: Jan. 15, 2008

(54) MODEM RELAY PROTOCOL REDUNDANCY FOR RELIABLE LOW SPEED MODEM COMMUNICATIONS OVER IP NETWORKS WITH SUBSTANTIAL PACKET LOSS

(75) Inventors: Erhan Guven, Rockville, MD (US); Edward N. George, Germantown, MD (US)

(73) Assignee: Texas Instruments Incorporated, Dallas, TX (US)

( * ) Notice: Subject to any disclaimer, the term of this patent is extended or adjusted under 35 U.S.C. 154(b) by 859 days.

(21) Appl. No.: 09/750,264

(22) Filed: Dec. 29, 2000

(65) Prior Publication Data
US 2002/0131415 A1  Sep. 19, 2002

(51) Int. Cl.
*H04L 12/56* (2006.01)
(52) U.S. Cl. .................................... 370/401
(58) Field of Classification Search ............. 370/242, 370/244, 252, 351–356, 401, 466, 352; 709/227–234
See application file for complete search history.

(56) References Cited

U.S. PATENT DOCUMENTS

| | | | |
|---|---|---|---|
| 5,459,722 A * | 10/1995 | Sherif .................... | 370/395.51 |
| 6,167,060 A * | 12/2000 | Vargo et al. ............ | 370/468 |
| 6,356,545 B1 * | 3/2002 | Vargo et al. ............ | 370/355 |
| 6,389,038 B1 * | 5/2002 | Goldberg et al. ....... | 370/471 |
| 6,438,105 B1 * | 8/2002 | Qarni et al. ............ | 370/231 |
| 6,483,600 B1 * | 11/2002 | Schuster et al. ....... | 358/1.15 |
| 6,515,996 B1 * | 2/2003 | Tonnby et al. ......... | 370/401 |
| 6,553,038 B1 * | 4/2003 | Fukuda ................. | 370/465 |
| 6,674,713 B1 * | 1/2004 | Berg et al. ............. | 370/217 |
| 6,678,250 B1 * | 1/2004 | Grabelsky et al. ..... | 370/241 |

* cited by examiner

*Primary Examiner*—Dmitry Levitan
(74) *Attorney, Agent, or Firm*—Steven A. Shaw; W. James Brady; Frederick J. Telecky, Jr.

(57) ABSTRACT

Minimized Wave-zone Buoyancy is a new approach to oil and gas platform design with superior construction and performance characteristics compared to state-of-art offshore drilling and production platforms. Minimized Wave-zone Buoyancy platforms capitalize on low cross sectional area of the portion of the platform exposed to waves. The low cross sectional area reduces buoyancy forces that result from vertical platform movement, enabling the platform to oscillate at a low natural frequency. The low cross sectional area also minimizes the cyclical vertical forces induced by waves. Compare to current designs, application of the Minimized Wave-zone Buoyancy concept will result in a lower natural frequency of oscillation, lower overall weight of platform, or both. Minimized Wave-zone Buoyancy offers an attractive alternative with improved platform stability, fatigue considerations, lower construction and installation costs, and shorter implementation schedule.

9 Claims, 8 Drawing Sheets

MODEM RELAY PROTOCOL STATE PACKETS

| PROTOCOL STATE | DESCRIPTION |
|---|---|
| OFFLINE | IDLE STATE |
| CARRIER LOSS | SILENCE ON THE ANALOG LINE, CARRIER LOSS |
| HANDSHAKE | MODEM DATA PUMPS WILL BEGIN HANDSHAKING PROCESS |
| CONNECT | LOCAL HANDSHAKE SESSION IS PASSED AND READY FOR MODEM RELAY |
| RELAY | MODEM RELAY TAKES PLACE |

MODEM HANDSHAKE STATE PACKETS

| HANDSHAKE STATE | DESCRIPTION |
|---|---|
| V25 | V.25 ANSWER TONE IS DETECTED ON THE LOCAL ANALOG LINE |
| V25PR | V.25 ANSWER TONE WITH PHASE REVERSALS IS DETECTED ON THE LOCAL ANALOG LINE |
| V21 | V.21 B1 SIGNAL IS DETECTED ON THE LOCAL ANALOG LINE |
| USB1 | V.22 USB1 SIGNAL IS DETECTED ON THE LOCAL ANALOG LINE |
| S1 | V.22bis S1 SIGNAL IS DETECTED ON THE LOCAL ANALOG LINE |
| SB1_1200 | V.22bis SB1 SIGNAL @ 1200 IS DETECTED ON THE LOCAL ANALOG LINE |
| SB1_2400 | V.22bis SB1 SIGNAL @ 2400 IS DETECTED ON THE LOCAL ANALOG LINE |

MODEM DATA PACKETS

| DATA TYPE | DESCRIPTION |
|---|---|
| V21 | V.21 DATA @ 300 bps |
| V22 | V.22 DATA @ 1200 bps |
| V22BIS | V.22bis DATA @ 2400bps |

FIG. 12

MODEM RELAY PROTOCOL REDUNDANCY FOR RELIABLE LOW SPEED MODEM COMMUNICATIONS OVER IP NETWORKS WITH SUBSTANTIAL PACKET LOSS

CROSS REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates to modem transmission over packet networks. In particular, the present invention relates to techniques for demodulating, relaying, and remodulating low speed (eg. V.22, V.22bis and V.21) modem transmissions over packet networks with a robust redundancy technique to maintain reliable communications in the event of high packet loss.

When modem devices are connected through a packet network, they are not directly connected. The entire modem signal is packetized the a sending end, sent over the packet network and reassembled into a designated format at the receiving end before presentation to the receiving modem device.

For example, packetizing and transporting of modem calls over gateway platforms using G.711 Pulse Code Modulation (PCM) codec, requires digitizing the originating modem phone line at 64 Kbps, packetizing and transporting the entire 64 kbps data stream to the other side, and then sending out the same 64 kbps data stream to the remote modem. The advantage of this approach is that it works for any modem that can be received on a standard POTS phone line, and it is simple to implement.

The disadvantage of this approach are:

(1) it requires a large amount of network bandwidth to implement the call and a connection can be dropped because of packet loss. If G.711 packets are being sent every 10 mSec, then the network bandwidth required to send each direction of the call is over 110 kbps (when the header sizes (RTP+UDP+IP+TCP+Ethernet) are included).

(2) The connection over a packet network is not a constant connection and often experiences line delays, errors, jitter and/or packet loss which can result in modem errors. In particular, packet loss results in interruptions in the modem signal (intermittent carrier loss) at the receiving modem. The interruptions result in degraded data throughput due to modem retrains and increased modem connection failures.

(3) Due to the clock differences at the two end points, standard G.711 playout techniques will periodically exhibit a modem signal interruption due to playout overruns and/or underruns. Again these interruptions in the modem signal lead to periodic modem retrains impacting data throughput rates.

In summary, when G.711 coding with packetization is used for data modem transmissions, the two modems are essentially communicating to each other using a potentially inadequate medium for their transmission. This approach is particularly vulnerable to network packet loss.

SUMMARY OF THE INVENTION

The modem relay of the present invention allows for the capability to demodulate, relay, and remodulate modem transmissions over packet networks.

The modem relay provides a local interface to the modem on both ends of the call, demodulates the full duplex data stream, packetizes the bits for transport over an IP network, and remodulates the data stream at the remote end. The modem relay provides bandwidth savings, and improved performance (data throughput and connection reliability) in a packet loss environment.

The modem relay mitigates the problems associated with using G.711 to send modem traffic. In modem relay, the physical layer or link layer of the modem signal is terminated locally for both ends of the call. Only the demodulated data stream is sent over the network. This leads to dramatic bandwidth savings. For a V.34 modem, in an exemplary embodiment, the 64 kbps phone line is demodulated into a maximum of 33,600 bps data stream. That data stream is packetized and transported with a network bandwidth of less than 20 kbps (for 30 mSec packets).

Since the physical layer is terminated locally, network packet loss will not result in any interruption in the modem signal at the receiving modem. Therefore this approach will eliminate connection failures due to the network packet loss. Instead a packet loss will result in an error in the information data stream.

Bandwidth savings are also realized using Modem Relay in that data is carried over the IP network only as the modem transmits data. When the modem is not transmitting data, no packets are sent on the IP network. In contrast, continuous 64 kbps packetization takes place when using G.711 to carry modem traffic. Depending on the network transport, the modem data is sent over the packet network using a guaranteed delivery mechanism (link layer termination) or sent using a non-guaranteed delivery mechanism (physical layer termination). In the case of a non-guaranteed delivery mechanism, data redundancy techniques can be used to combat packet loss and improve data throughput.

DETAILED DESCRIPTION OF THE INVENTION

The modem relay for V.22bis modems and below occurs at the physical layer. The modem's physical layer is demodulated into a bitstream and that bitstream is relayed end-to-end across the network. Any higher layer protocols (error correction, compensation) that may be present are passed end-to-end across the network.

Figure 1:
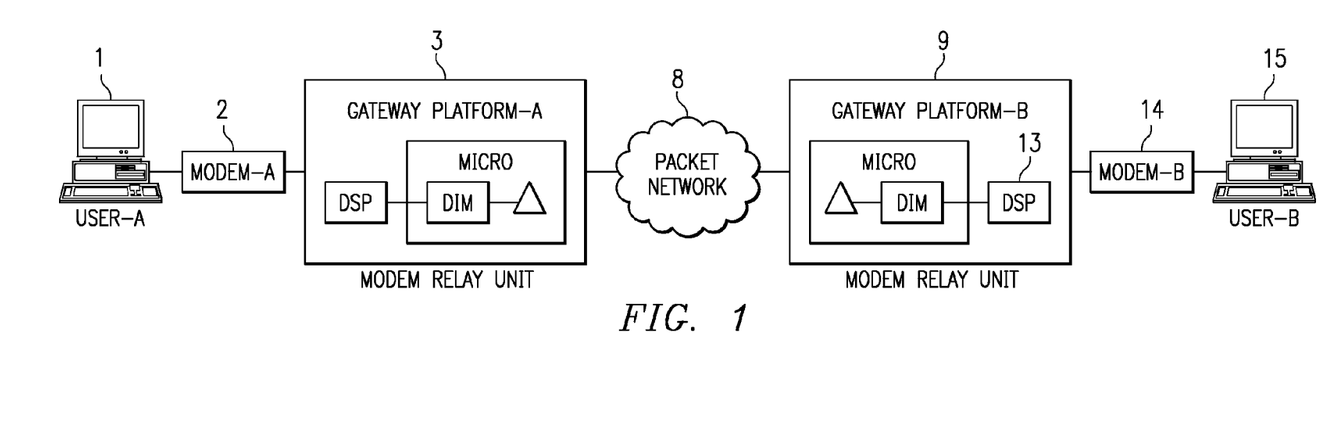
FIG. 1 is a diagram illustrating the components of a modem relay configuration.
Figure 2:
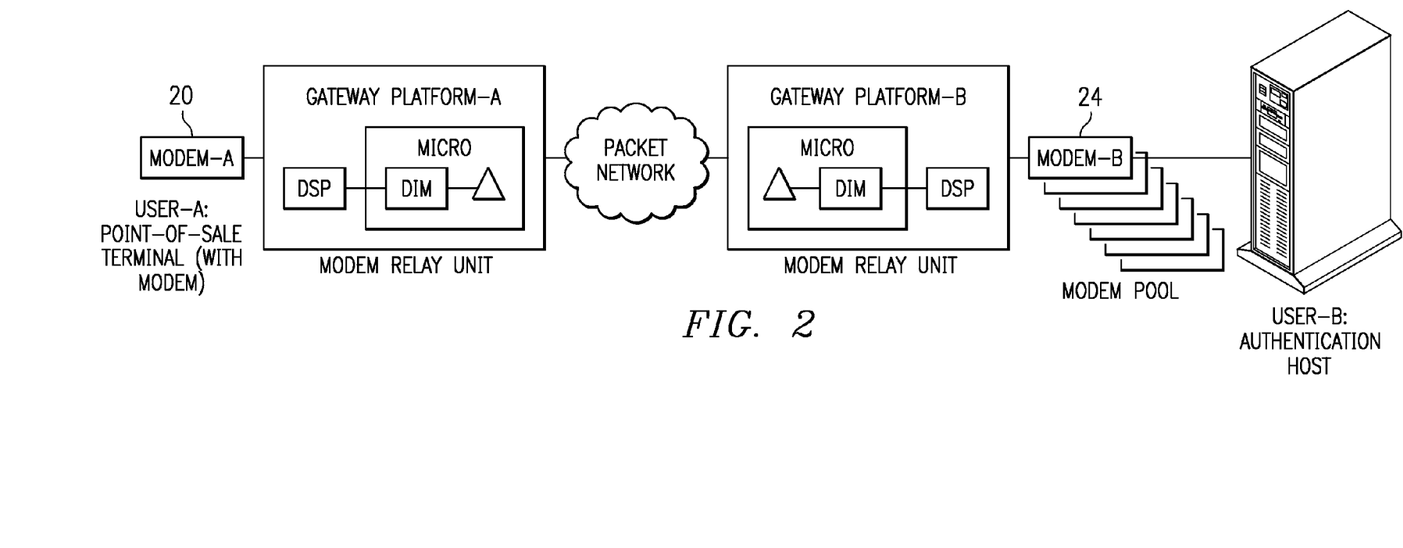
FIG. 2 is a diagram illustrating a point-of-sale implementation of the present invention.

A typical modem relay system configuration is illustrated in FIG. 1. For lower speed modems, a typical end-user application is in point-of-sale terminals used to implement credit card validation. FIG. 2 illustrates a point-of-sale implementation using modem relay.

The steps in setting up a modem relay connection are:

1) A first user, initiates a modem call using a dial-up modem, such as modem 2 attached to a personal computer 1 or in a point-of-sale terminal 20, at the first end of the connection.

2) Modem 2, enters an off-hook state, dials and waits for the far end modem 14 to answer.

3) The first gateway 3 detects the line seizure, opens a DSP voice channel and collects DTMF digits.

4) The first gateway 3 translates the dial number and attempts to perform a call setup to the far end gateway 9 which is located at a remote point in the network.

5) Gateway 9 detects the incoming call setup from gateway 3 over the packet network 8. The gateway 9 accepts the incoming call and opens a DSP voice channel to handle the incoming call. Next, gateway 9 seizes the outgoing line.

6) For modem relay, the outgoing line connects to modem 14 at the far end which may be connected to a personal computer 15 or may be a modem in a modem pool 24. Modem 14 goes off-hook and plays a modem answer sequence (eg. V.25 ANS tone).

7) Gateway 9 detects the modem's answer sequence (as described below) and switches the DSP over from a voice channel to a modem relay channel. Then gateway 9 sends the switch over message to gateway 3 in the form of a modem relay message packet. Gateway 9 also continues to negotiate with far end modem 14 to establish a data connection to PC 15.

8) Gateway 3 switches its channel to modem relay and begins to negotiate channel setup with modem 2.

9) During the negotiations, control messages are exchanged between gateway 3 and gateway 9 to coordinate the compression format used on both sides of the link and to establish the gateway to gateway Link Access Procedure for Modems (LAPM) link. At the end of the negotiation, both modems have connected with their respective local gateway at the best possible connection rate using V.42 LAPM and the same type of compression. Further, the modems on both sides have transitioned into data mode and are ready to begin sending or receiving data.

10) Modem 2 and modem 14 now begin sending data back and forth across the packet network 8. Each gateway unit demodulates the modem transmissions, packetizes the data and sends it to the far side. The gateway on the far side remodulates the modem data and sends it to the far end modem. Throughout the connection, flow control is performed on each segment of the link to regulate the error free transmission of data.

11) The connection continues until one of the modems hangs up. At that point, the call is terminated on both sides and the channels then return to idle.

Throughout a modem relay call, the state machines in the modem relay unit periodically send line status updates to make sure that both modems remained in sync with each other.

Figure 3:
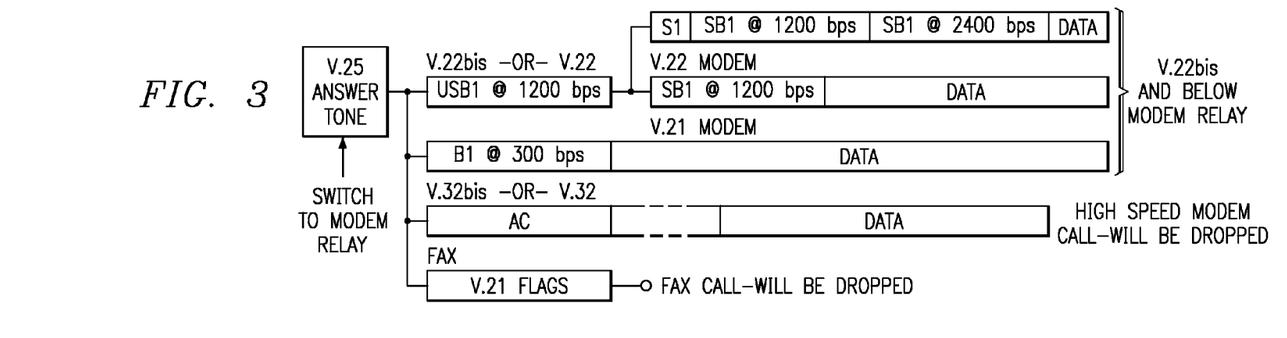
FIG. 3 is a flow decision diagram illustrating the decision sequence for determining the modulation and connection speed.

The operation of modem relay is driven by events that occur when gateway 9 seizes its outgoing line and places a call to modem 14. Initially gateway 9 does not know that the call is a modem call, and begins by using a voice processing configuration in the DSP 13. When modem 14 answers, it begins play out of a V.25 answered tone (ANS), as illustrated in FIG. 3.

When modem relay is enabled, gateway 9 switches to the low speed modem relay DSP code after it detects the V.25 answered tone, and proceeds to monitor the incoming sequence from modem 14. Gateway 9 attempts to establish a V.22bis, V.22 or V.21 data connection. Depending on the type of modem on the line, the decision sequence illustrated in FIG. 3 is executed to determine the modulation and speed for the connection. If a fax signal is detected, the modem relay code sends a message to the microprocessor code to perform a switch to fax relay.

At each stage of the negotiation process, gateway 9 will be sending signaling messages across the network to gateway 3. Because there is no guaranteed method of flow control between lower speed modems, both sides of the connection must be trained to operate at the same modulation and rate. Therefore, signaling messages are used to determine if the capabilities of the two modems can support an optimal connection. If there is a capability overlap, the best commonly supported data rate will be selected at both sides. If there is no modulation and rate common to modem 2 and modem 14, then the call will be a connected independently at both sides. These "uneven" connections work, but not as efficiently as connections that support the same data rate at both ends.

For V.32 modems and above, V.42 error correction is frequently used to provide link layer connectivity and error correction between the two modem and points. For V.22bis modems and below, V.42 error correction may or may not be present in the connection.

For V.22bis modems and below, if V.42 is present, it is handled transparently by passing error correction end-to-end over the network. Therefore, both modems have to be synchronized at the start of the call to use the same modulation and data rate. Then, V.42 and other high layer protocols are simply ignored by the modem relay software. This approach will work provided that network end-to-end delays do not exceed one second. If the network delay exceeds one second, then the modems will be able to connect to each other but not be able to establish LAPM protocols across the link, which will increase the error rate and prevent data compression (V.42bis) for the modem session.

There is currently no network protocol standard defining the call control or data transmission protocol for modem relay over packet networks. Therefore, a proprietary approach is utilized by the present invention to implement modem relay. However, the present invention can be implemented with a standard protocol without departing from the scope of the inventive concepts taught herein. The protocol is similar to the proprietary fax relay protocol disclosed in co-pending application Ser. No. 09/031,047. The modem relay protocol used accommodates encapsulation using the RTP format for transmission across the network.

The modem relay protocol has the following features:

Redundant Signaling Messages—There are two types of signaling messages: call control and modem control signaling. Once a modem call is established, the only call control message that is expected is a termination event. Modem control messages including events like forced retraining or carrier loss events. All of the signaling messages between the two gateway units 3 and 9, are sent periodically throughout the call by the modem relay unit. They are sent more rapidly during call setup and negotiation. A signaling message is contained in a single modem relay packet, which conveys the current state of the call. If the network drops any one signaling packet, another packet will be sent soon so that the call can still proceed normally. If there is a network outage during a modem call that interrupts the packet flow between modem relay units, each side of the connection will perform a clear down on its part of the call.

Redundant data. Instead of sending the same packet several times, data redundancy is achieved by appending data from previous packets in the payload section of the current data packet. Then, the receiving gateway uses the packet sequence number to determine if there has been a packet loss. If no packet loss occurred, it uses the most recent data field in the packet. If the receiving gateway detects that packet loss has occurred, the data fields for lost packets are retrieved by reading further down in the current packet. Data redundancy effectively increases the network bandwidth, though the actual data from the modem is a small part of the overall packet size. For instance, in a 2400 bps modem with a 10 mSec VIF size, the data size is 3 bytes and the header size is 48 bytes per network packet. Adding in additional 3 byte data fields will not increase the overall packet size by a significant amount based on a percentage of the total size. The amount of redundant data contained in each packet is configurable.

Retraining is also accommodated by the present invention. In the event that one of the modems in the connection experiences a loss of equalization on the line, it can initiate a retrain signal. When a gateway receives the retrain signal, it executes the retraining sequence locally and sends the retrain signal across the network to the other gateway. Both sides of the connection are negotiated to support the best case common rate.

Since the retraining and rate signaling events may not be supported by one of the modems in the connection, a potential system problem occurs when one side initiates a retrain. The significance of this problem will depend upon the modem capabilities. If both sides of the call cannot be retrained to the compatible rate, the call will be terminated and cleared.

Call discrimination is accomplished through processing in the DSP. When a call is connected, the gateway must determine what type of call processing is required to successfully implement the call: voice, fax relay, or modem relay. Individual channels can be pre-configured for a certain type of processing, but in general the gateway does not know in advance what type of devices are going to be involved in the call. The earlier it can distinguish the type of traffic involved in a call, the faster it can switch over to use the right set of processing resources.

Figure 4:
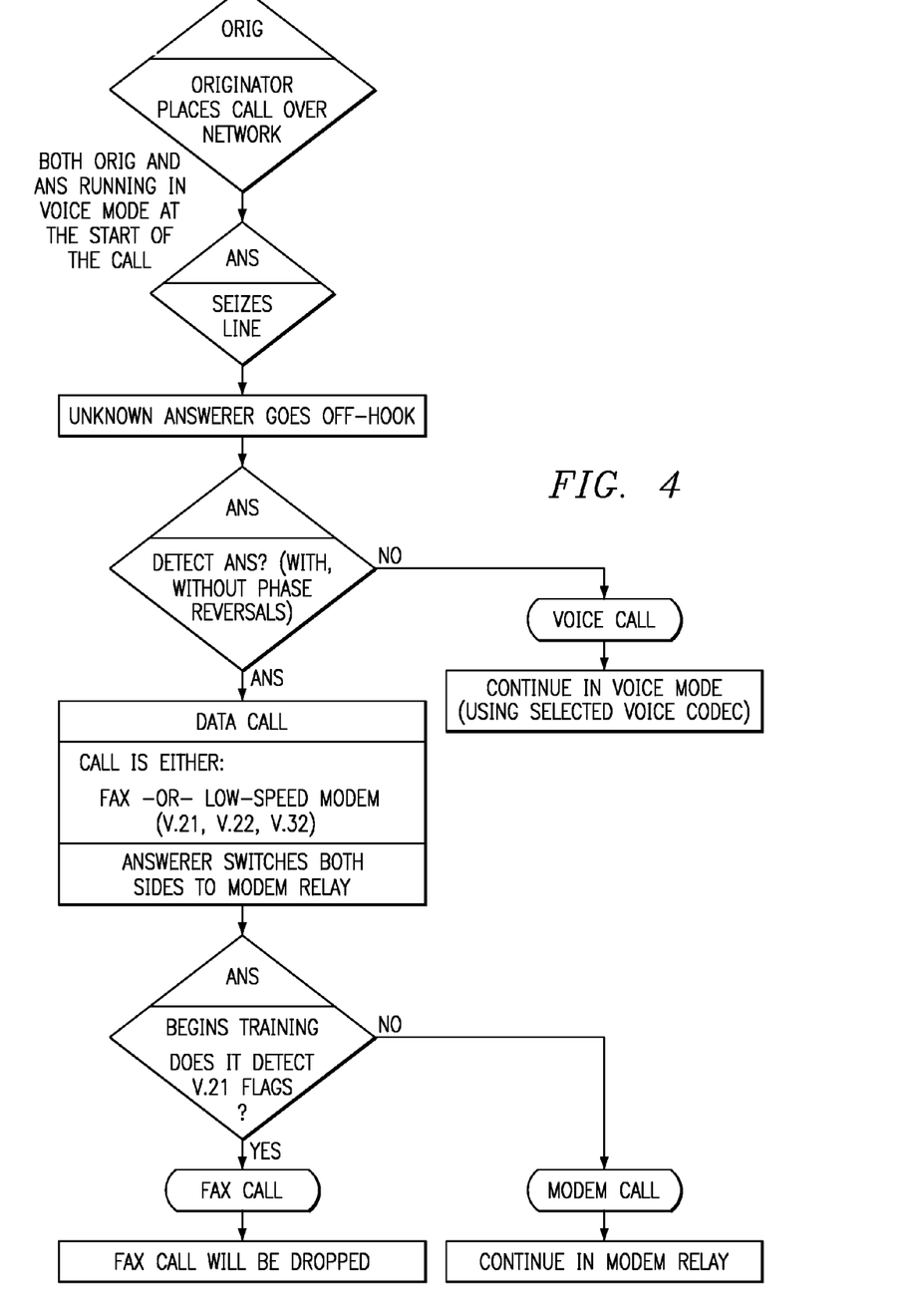
FIG. 4 is a logic diagram illustrating an exemplary logic structure for modem identification and modem relay activation.
Figure 5:
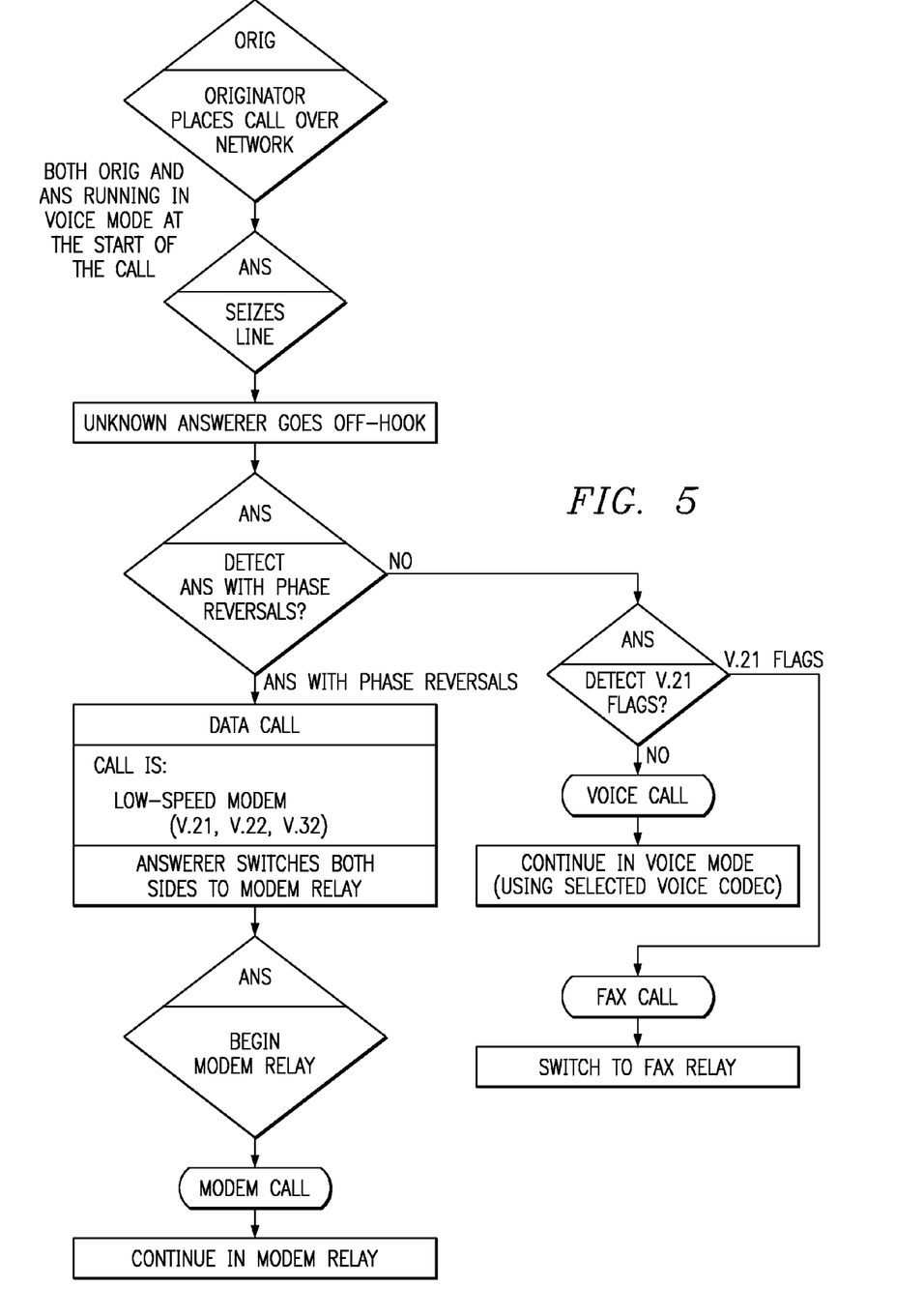
FIG. 5 is a logic diagram illustrating an alternative logic structure for modem identification and modem relay activation.

FIGS. 4 and 5 illustrate alternative embodiments for the decision tree for determining the processing sequence for new calls. Initially, the originator places a call were the packet network. Upon detecting a call, the answering gateway sees the line and goes off hook. The answering gateway then determines if a V.25 answer tone (ANS) with phase reversal, used by V.32, V.22 and V.21 modems, is present. When detected on the answering side, the gateway will switch to modem relay processing.

If phase reversal is not present, the ANS is the basic V. 25 answer tone used by fax machines and V. 32, V. 22 and V. 21 modems. When detected on the answering side, the gateway will switch to modem relay processing is the channel is reconfigured for modem relay and will not switch if the channel is potentially expecting fax transmissions. In the event that no ANS tone is detected, the answering gateway will then check for V. 21 flags which is the queue to switch to fax relay processing. If no events are detected, the gateway will to continue to process the call using voice codec.

Figure 6:
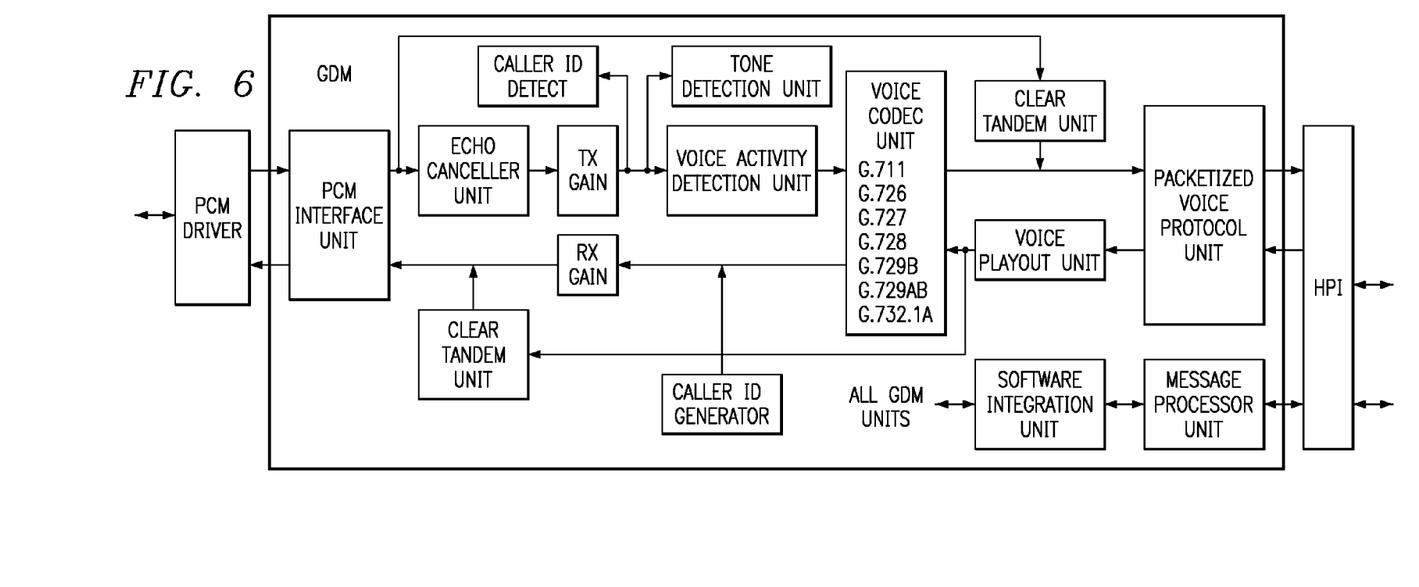
FIG. 6 is an exemplary implementation of a DSP voice channel configuration.
Figure 7:
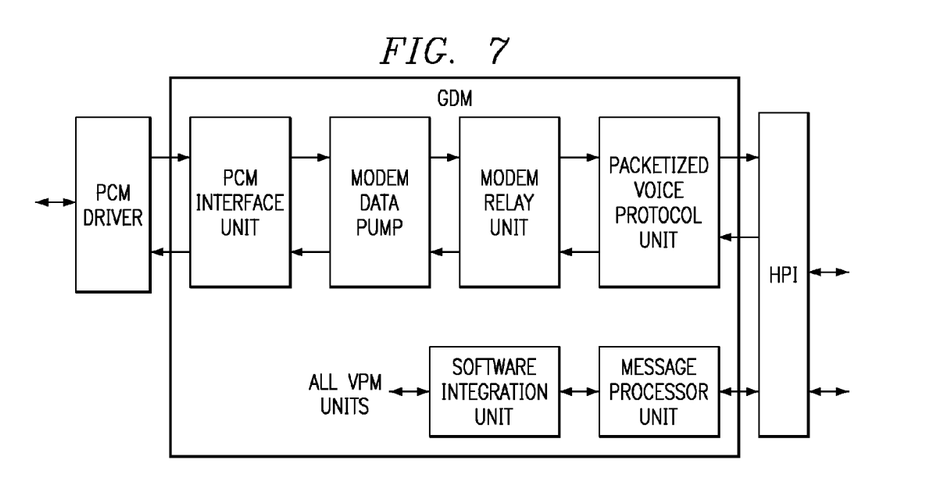
FIG. 7 is an exemplary modem relay DSP configuration.

Most of the functionality required to implement modem relay is located in the DSP software of the gateway. FIG. 6 illustrates a standard DSP voice channel configuration. When added, the modem relay unit, MRU, is added as a processing lock in the DSP software, FIG. 7. Modem relay channels are added to the DSP system integration unit SIU. Modem data pumps are added to the DSP software. Modem relay encapsulation and protocol functions are added to the MRU DSP software and MRU configuration and statistics commands are added to the SIU.

The microprocessor of the gateway also needs to be modified to accommodate the modem relay processing requirements. The microprocessor must respond to messages from the DSP that instruct the microprocessor to switch over from a voice channel to a modem relay channel in the DSP. The microprocessor must be able to respond to modem relay packets arriving from the network by switching a voice channel to a modem relay channel in the DSP. The microprocessor must allow the operator to configure and query statistics on modem relay channels and must extend the existing operator command set to accommodate commands needed to implement modem relay.

The System Integration Unit (SIU) handles control and status messages from the microprocessor that reference to channel as it does for other types of DSP channels. Messages from the microprocessor that are unexpected or not supported in modem relay mode will be returned with an error code.

Figure 8:
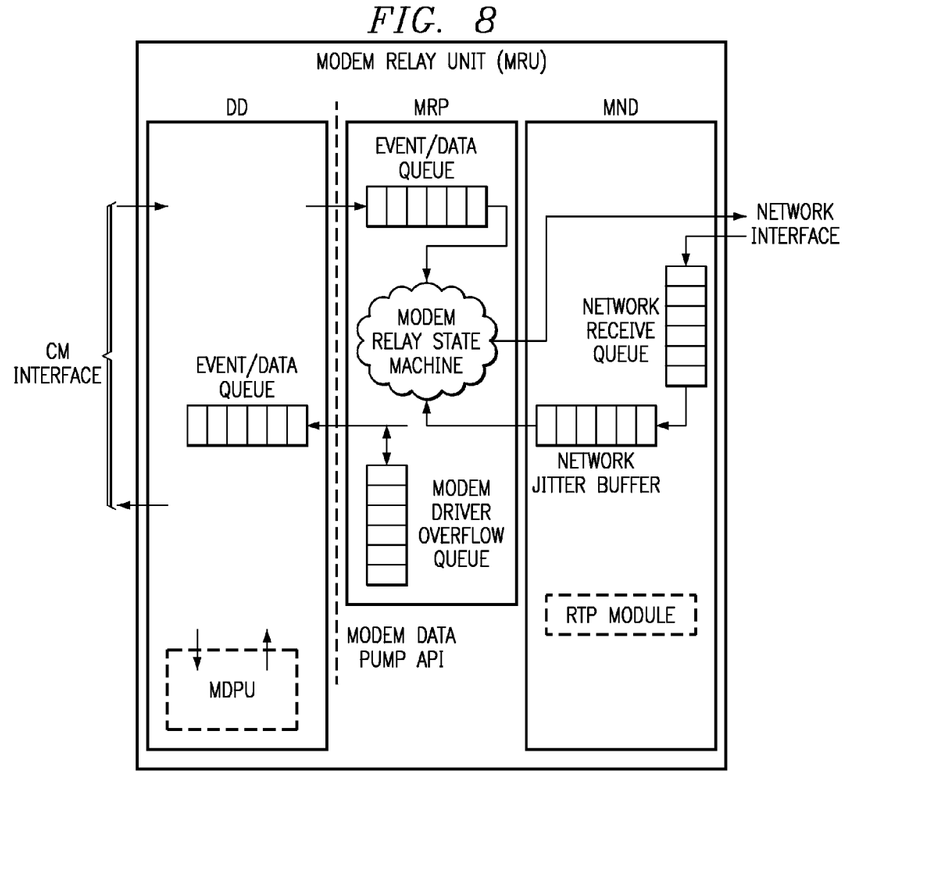
FIG. 8 is functional block diagram of an exemplary modem relay unit.

Within the MRU, FIG. 8, is the functional software for modem relay. The structure of the MRU includes a modem driver connected to the PCM interface, a modem relay protocol unit and a modem network driver which connects to the network interface. The modem driver provides the interface between the PCM interrupt routine and the modem data pump, which performs the physical modulation and the modulation functions of the current modem. The modem relay protocol module tracks the modems control and state machine functions and provides both data and messaging queues and overflow buffers. It also formats the modem data and signals into the proprietary modem relay protocol. The modem network driver performs the RTP encapsulation functions to implement the modem relay protocol containing signaling messages and data. It also provides a jitter offer to compensate for network delays.

Figure 9:
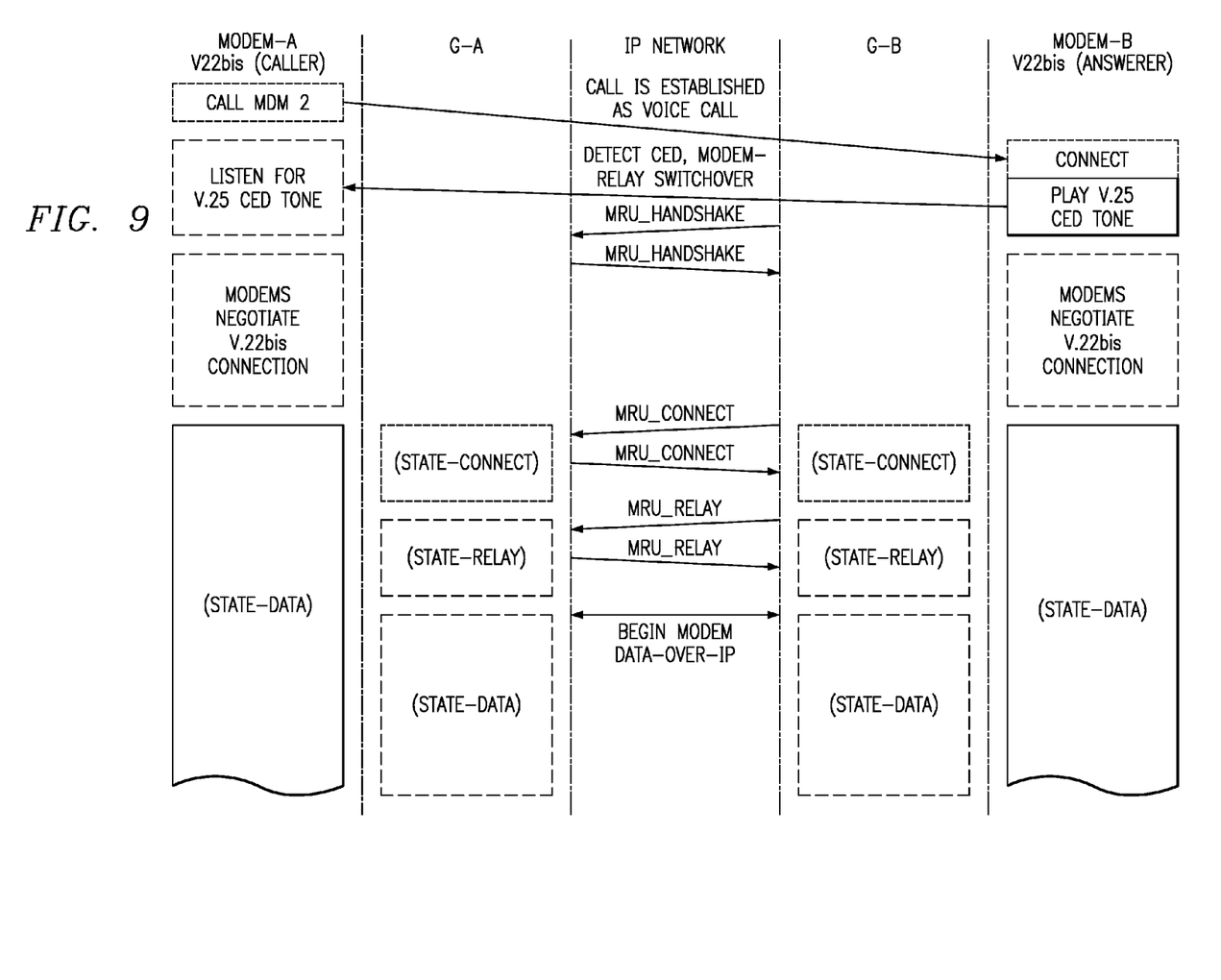
FIG. 9 is a ladder diagram illustrating the establishment and negotiation of a connection using V. 22 bis modems.

The establishment and negotiation of a connection using V. 22 bis modems is illustrated in the connection ladder diagram of FIG. 9. The modems will establish and negotiate a connection between the two gateways using the gateway communication messages to coordinate the modem sessions.

As illustrated, the call is initially established as a voice call until the tones to establish modem relay are detected. The modem relay units exchanged a handshake, and appropriate connection is negotiated the modem relay units contact and then establish relay states for beginning the modem data over IP communication.

Figure 10:
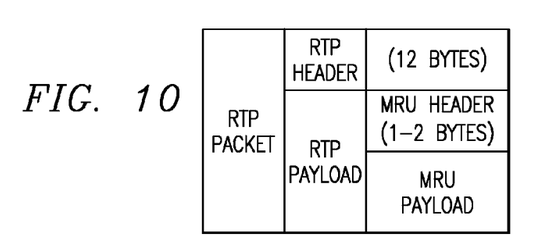
FIG. 10 illustrates a typical IP packet for the present invention.

In order to properly implement a modem relay, it is necessary to establish packetization parameters as well as modem functional parameters such as modulation and rate. The approach of the present invention defines the modem relay unit packet format to be encapsulated by RTP packets for use by compatible gateways with modem relay units. In order to establish and maintain a modem connection over a packet network, the originating and terminating gateways must have a common modem relay unit packet format. The packet, FIG. 10, transported over the digital packet network, consists of a sequence number, time stamp, modem handshake, modem relay protocol and modem data depending on the process modem relay state. The packet format is illustrated in FIG. 10.

Figure 11:
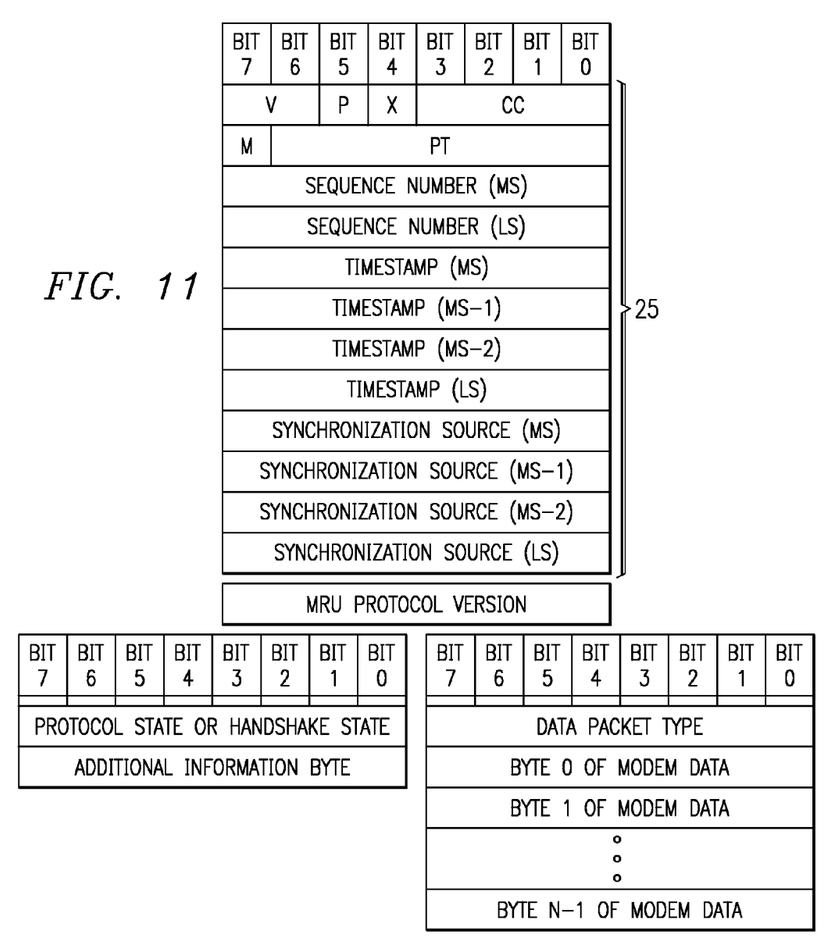
FIG. 11 illustrates an exemplary MRU packet format of the MRU payload within the RTP packet of the present invention.
Figure 12:
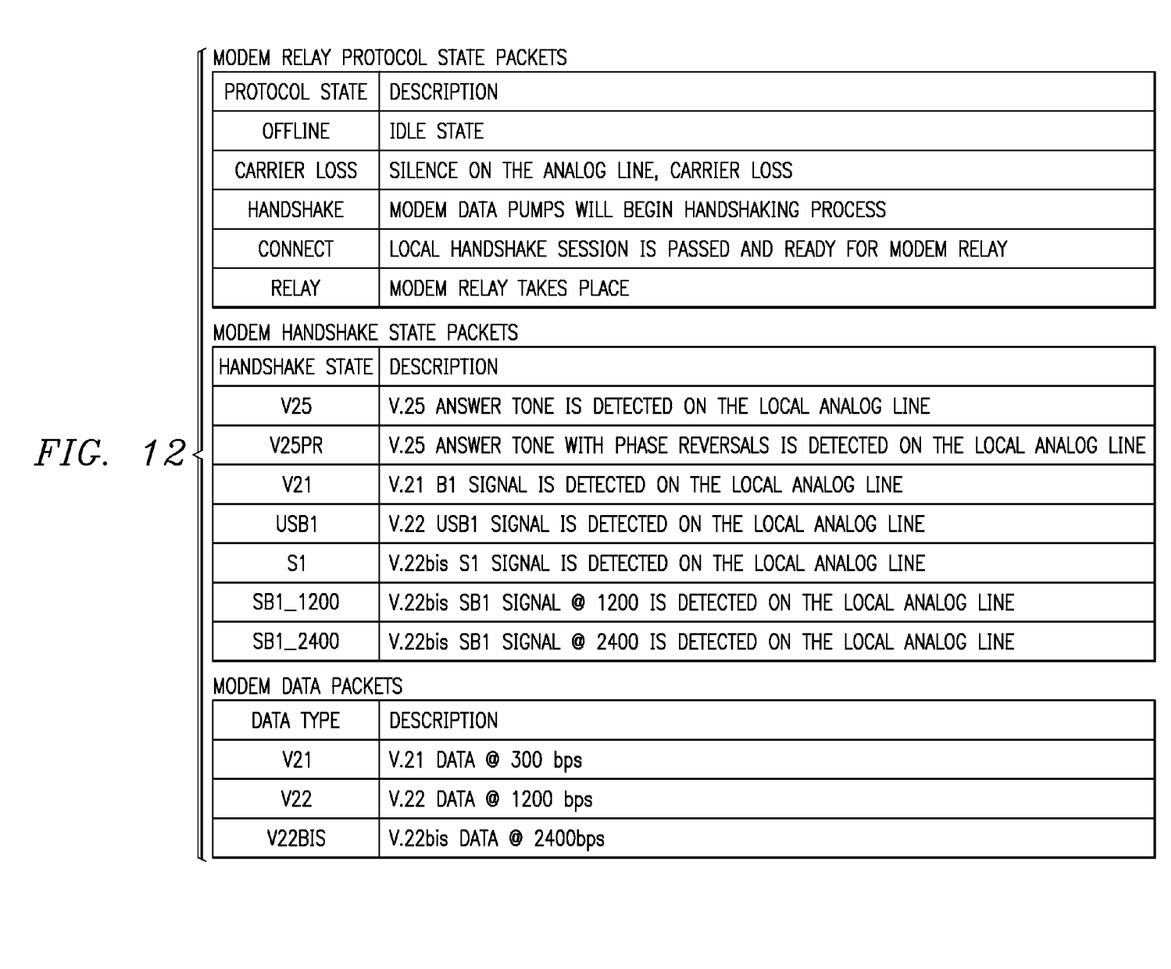
FIG. 12 illustrates the modem relay protocol state packets, modem handshake state packets and modem data packets.

FIG. 11 illustrates the MRU packet format of the MRU payload within the RTP packet. The illustrated exemplary embodiment illustrates a bit payload with redundancy. Because the modem relay unit of the present invention maintains the modem connection with the modem at each end of the connection, the data can be packetized into a packet with a standard RTP header and time stamp. Following the RTP header, blocks 25 in FIG. 11, is a field indicating the MRU protocol version. Identification of protocol version allows for better capability match and backward compatibility for more recent protocols. The digital fields in the packet include protocol state packets, handshake state packets and data as the exemplary packets in the present invention. Other protocols said packets can be included. The modem relay protocol state packets, modem handshake state packets and modem data packets are illustrated in FIG. 12.

In addition to establishing protocols for packetization, protocols for a method for established communication across a packet network between modem relay units, must also be established. Once a call is established across a network with acceptable network delay and packet loss, the modem data pumps in the modem relay units begin the handshake routine with the respective local modems. The modem data pumps are also able to report local connection and carrier loss information to the modem.

Once a call is established across a network, both modem relay units send modem relay handshake message packets to the other modem relay unit. The initial packet contains the information on supported modem rates. The packet is repeated every 50 milliseconds to overcome packet losses. As soon as the first message is sent over the network, a timer is set to 5 seconds and started. The modem data pumps are maintained at idle during the handshake phase. When the handshake message is received the rate bit mask is added with the local rate bit mask. The highest speed is chosen from the resulting value and handshake is initiated with the local modem. The modem data, will be started and connected at the best possible data rate.

If the handshake message is not received, then the timeout occurs and highest speed is chosen from the local rate bit mask. The hand shake is initiated with the local modem and the modem data pump is started.

As soon as a local handshake is reported, the modem relay unit will send the connect message packet to the other side. This message is also repeated every 50 milliseconds to overcome packet losses. When the connect message is received, the receiving MRU sends the reply message packet to the other site and continues to communicate with data packets. The reply message is for acknowledgment purposes and is not repeated. When a carrier loss occurs, the modem relay unit will send the carrier loss message packet to the other side. This message is repeated every 50 milliseconds to overcome packet loss. When the MRU connect message is received, the MRU sends the MRU relay message to the other side and continues to communicate with data packets. This message is for informational modem purposes and will not be repeated.

In the majority of packet networks, some packet loss is experienced. Therefore, the present invention includes a data redundancy technique which makes the modem relay reliable even in the presence of substantial packet loss over the packet network. Simple redundancy techniques can recover the information contained in lost packets if a single packet is lost. However, in the event of sequential packet loss, additional packet information may be unrecoverable. Because modem relay is highly dependent upon transmission of all packets, it is important to provide a data redundancy technique appropriate to the modem relay of the present invention.

When packet loss exceeds a certain value, it is not possible to maintain reliable communication using the modem relay of the present invention. Therefore, data redundancy as taught herein is implemented. A whole number value k is provided as a repetition count. The value must be known by each gateway at each side of the connection and must be the same for each gateway. The value of k is negotiated by the gateways and can be dependent upon the characteristics of the packet network. A whole number N is provided as the number of new bytes in each data packet. Again, both gateways must agree on the size of the new data buffer.

Each packet is encapsulated with a certain packet format including a sequence number uniquely assigned to each packet that is transmitted. The transmitting gateway receives Data [1:N] in each iteration to be encoded into the data packet. The transmitter encodes the data packets with the redundancy taught by the present invention as follows:

|  | 1st data packet | 2nd data packet | 3rd data packet | ... | kth data packet | (k + 1)th data packet |
|---|---|---|---|---|---|---|
| Seq. # | S | S + 1 | S + 2 |  | S + k | S + k + 1 |
| Data (length = kN) |  |  |  |  | Data [1:N] Data [N + 1:2N] Data | Data [N + 1:2N] Data [2N + 1:3N] Data |

-continued

| 1st data packet | 2nd data packet | 3rd data packet | ... | kth data packet | (k + 1)th data packet |
|---|---|---|---|---|---|
| | | | | [2N + 1:3N] | [3N + 1:4N] |
| ... | ... | ... | | ... | ... |
| | | | | Data [(k − 4)N + 1:(k − 3)N] | Data [(k − 3)N + 1:(k − 2)N] |
| | | Data [1:N] | | Data [(k − 3)N + 1:(k − 2)N] | Data [(k − 2)N + 1:(k − 1)N] |
| | Data [1:N] | Data [N + 1:2N] | | Data [(k − 2)N + 1:(k − 1)N] | Data [(k − 1)N + 1:kN] |
| Data [1:N] | Data [N + 1:2N] | Data [2N + 1:3N] | | Data [(k − 1)N + 1:kN] | Data [kN + 1:(k + 1)N] |

The above table references a series of encoded packets with expanding data lengths of length kN that have sequence numbers beginning with sequence number S up to S+k+1. In the table, the cells denoted "ΔXΔX" on the left side of the table can indicate either empty data slots in the packet or null data entered in the packet because the data stream is beginning to be encoded into the packets and the redundancy technique of the present invention has not yet filled these slots in each packet with encoded data.

The receiving gateway decodes the data packet according to the following procedure. First the receiving gateway determines the value of D which is equal to the difference between the sequence number of the currently received data packet and the sequence number of the last previously received data packet. If the value of D is equal to one, no packets were lost and the receiving gateway need only output the bits of data corresponding to the most recent bits in the data packet. If the value of D is greater than one, the receiving gateway must output each set of data corresponding to the number of packets equal to the value of D, beginning with the most recent data packet and proceeding backwards to acquire data packets corresponding to the lost packet network packets.

If the value of D exceeds k, then the value of k should be re-negotiated between the two gateway's. First, upon detection of a value of D which exceeds the value of k, the receiving gateway reports a loss equal to (D−k)N bytes. The receiving gateway then assigns a value D to the value k. By increasing the value of k to equal the actual number of lost packets, the redundancy can be adjusted to compensate for increases in packet loss across the packet network. Also, the receiving gateway can request a retransmission of the last DN bytes from the transmitting gateway to compensate for the packet loss not provision for in the redundancy k.

Because the receiving gateway calculates the difference in the loss of packets and the transmission redundancy, the redundancy can be adjusted. The amount of redundancy can be increased or decreased dependent on the current packet loss across the network as detected by the modem relay. In this manner, redundancy can be responsive to not only the network loss but also the individual network loss experienced in real time by the present modem relay session.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

We claim:

1. A method for reducing data loss in event of packet loss in a modem relay connection over a packet network including a transmitting modem and a transmitting gateway, a receiving modem and a receiving gateway, the method comprising:

providing a packet format including a header portion, a sequence number and a data portion;

dividing said data portion into a plurality of segments; designating one of said segments as a new data segment;

providing a plurality of sequential blocks of modem data from said transmitting modem to said transmitting gateway;

retaining a predetermined number of said plurality of sequential blocks of modem data at said transmitting gateway, by dropping a first oldest block and retaining a most recent block; providing said most recent block of data in said designated new data segment of said data portion of said packet;

providing a plurality of remaining retained blocks of data in a remainder of said said plurality of segments;

wherein:

each time said transmitting gateway receives a new block of data from said transmitting modem, an additional oldest block is dropped from said remaining retained blocks of data, creating a new remaining retained blocks of data;

said new block of data is encoded in a next data packet as a new data block; and said new remaining retained blocks are encoded into said data packet as a plurality of redundant data blocks;

wherein the plurality of redundant data blocks are added by a data redundancy with a repetition count k, and wherein the redundancy is performed as data encoding into each packet according to the following formulas, where x is a current packet sequence number, N represents a plurality of data bits corresponding to each of said data packet as said data packet is, and each iteration encodes said plurality of data bits for a current packet x and a plurality of previous packets into a data length of the current packet, an addition sign signifying grouping the data bits together in a block within the packet for each iteration:

$[x-j]N+[x-i]N$ where i=(0 to (k−1)) and j=(1 to k) and each of the variables i, j increase by 1 in each iteration up to k levels of iterations that are performed for each of said packets;

transmitting said packets from said transmitting gateway to said receiving gateway.

2. The method of claim 1, further comprising:

receiving said transmitted packets;

reading said sequence numbers of a plurality of consecutively received packets to detect a plurality of lost packets and thus a data lost;

comparing said sequence number of a sequential ordering of said received packets, and determining a difference in said compared sequence numbers; and providing the redundant data corresponding to said data lost during said packet loss to said receiving modem.

3. The method of claim 2, wherein a number of said retained predetermined number of sequential blocks is re-negotiated when said number of detected lost packets exceeds said retained predetermined number of sequential blocks between said transmitting gateway and said receiving gateways.

4. The method of claim 3, further comprising:

detecting a value of the number of lost packets which exceeds the value of said retained predetermined number of sequential blocks;

reporting said detection; and adjusting the redundancy to compensate for increases in packet loss across said packet network.

5. The method of claim 1, wherein each k iteration of the data redundancy in each packet encodes together N bits of data from a first packet and a second packet paired together, and wherein the second packet has a preceding packet sequence number to the first packet in the transmission.

6. A method for modem relay data redundancy, comprising:

establishing a modem relay transmission of a plurality of packets between a first modem relay unit (MRU) and a second MRU over a packet network, wherein each packet in the transmission between the first and the second MRUs is formatted with a sequence number uniquely assigned to each packet;

negotiating a data redundancy repetition count k between the first and the second MRUs;

applying a data redundancy to the modem relay transmission, wherein the redundancy is performed as data encoding into each packet, according to the following formula where x is a current packet sequence number, N represents a plurality of data bits corresponding to each packet as the packet is, and each iteration encodes said data bits for the current packet x and previous packets into a data length of the current packet, an addition sign signifying grouping the data bits together in a block within the packet for each iteration:

$[x−j]N+[x−i]N$ where i=(0 to (k−1)) and j=(1 to k) and each of the variables i, j increase by 1 in each iteration up to k levels of iterations that are performed for each packet.

7. The method of claim 6, wherein each k iteration of the data redundancy in each packet encodes together N bits of data from a first packet and a second packet paired together, and wherein the second packet has a preceding packet sequence number to a first packet in the transmission.

8. A system for modem relay, comprising:

a first modem relay unit (MRU) transmitting packetized data in a plurality of packets over a packet network to a second MRU;

wherein the first MRU formats each packet in the transmission with a sequence number uniquely assigned to each packet, the first and the second MRUs negotiate a data redundancy repetition count k between the first and the second MRUs, the first MRU applies a data redundancy to the modem relay transmission, wherein the redundancy is performed as data encoding into each packet, according to the following formula where x is a current packet sequence number, N represents a plurality of data bits corresponding to each packet as the packet is, and each iteration encodes said data bits for the current packet x and previous packets into a data length of a current packet, an addition sign signifying grouping the data bits together in a block within the packet for each iteration:

$[x−j]N+[x−i]N$ where i=(0 to (k−1)) and j=(1 to k) and each of the variables i, j increase by 1 in each iteration up to k levels of iterations that are performed for each packet.

9. The system of claim 8, wherein each k iteration of the data redundancy in each packet encodes together N bits of data from a first packet and a second packet paired together, and wherein the second packet has a preceding packet sequence number to the first packet in the transmission.

* * * * *